United States Patent
Cox et al.

(10) Patent No.: US 8,996,890 B2
(45) Date of Patent: Mar. 31, 2015

(54) METHOD FOR POWER CONSERVATION IN VIRTUALIZED ENVIRONMENTS

(75) Inventors: Robert Cox, Austin, TX (US); Sudhir Shetty, Cedar Park, TX (US); Puneet Dhawan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1465 days.

(21) Appl. No.: 12/027,361

(22) Filed: Feb. 7, 2008

(65) Prior Publication Data

US 2009/0204826 A1 Aug. 13, 2009

(51) Int. Cl.
*G06F 1/32* (2006.01)
*G06F 9/50* (2006.01)

(52) U.S. Cl.
CPC ............ *G06F 1/3203* (2013.01); *G06F 9/5088* (2013.01); *G06F 9/5094* (2013.01); *Y02B 60/142* (2013.01); *Y02B 60/162* (2013.01)
USPC ......................................................... 713/300

(58) Field of Classification Search
CPC ................................. G06F 1/32; G06F 9/4856
USPC ......................................................... 713/300
See application file for complete search history.

(56) References Cited

U.S. PATENT DOCUMENTS

| | | | |
|---|---|---|---|
| 6,732,241 B2 | 5/2004 | Riedel | |
| 6,795,928 B2 | 9/2004 | Bradley et al. | |
| 6,964,539 B2 | 11/2005 | Bradley et al. | |
| 7,007,183 B2 | 2/2006 | Rawson, III | |
| 7,032,119 B2 | 4/2006 | Fung | |
| 7,188,260 B1 * | 3/2007 | Shaffer et al. | 713/300 |
| 7,644,148 B2 * | 1/2010 | Ranganathan et al. | 709/223 |
| 7,787,405 B2 * | 8/2010 | Dettinger et al. | 370/311 |
| 7,793,120 B2 * | 9/2010 | McGrane et al. | 713/300 |
| 7,844,839 B2 * | 11/2010 | Palmer et al. | 713/300 |
| 7,870,153 B2 * | 1/2011 | Croft et al. | 707/781 |
| 8,225,118 B2 * | 7/2012 | Ishikawa | 713/320 |
| 2005/0060590 A1 * | 3/2005 | Bradley et al. | 713/320 |

* cited by examiner

*Primary Examiner* — Kim Huynh
*Assistant Examiner* — Eric Chang
(74) *Attorney, Agent, or Firm* — Terrile, Cannatti, Chambers & Holland, LLP; Stephen A. Terrile

(57) ABSTRACT

A system and method for enabling power conservation when making placement and relocation decisions. More specifically, a virtualized environment power conservation module enables power conservation when making placement and relocation decisions within a virtual environment. The virtualized environment power conservation module assigns virtual machines among a group of physical hosts in order to minimize the net power consumption. The virtualized environment power conservation module makes use of server power profile or real time power consumption data to make power consumption aware Virtual Machine assignment decisions. In certain embodiments, a server system exposes real power consumption (e.g. System Watts, Cumulative kWh. etc.) via system management interfaces. Additionally, in certain embodiments, the server systems may expose real power consumption via standard power profiles. These systems leverage PMBus-enabled power supplies to read the power metric information.

12 Claims, 4 Drawing Sheets

METHOD FOR POWER CONSERVATION IN VIRTUALIZED ENVIRONMENTS

BACKGROUND OF THE INVENTION

1. Field of the Invention

The present invention relates to information handling systems and more particularly to a method for power conservation in virtualized environments.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with virtualized environments. In a virtualized environment, the information handling system abstracts computer resources. Thus, the physical characteristics of the computing resources are hidden from the way in which other systems, applications, or end users interact with those resources. In a virtualized environment, a single physical resource (e.g., a server, an operating system, an application, or storage device) can appear to function as multiple logical resources. Alternately, multiple physical resources (e.g., storage devices or servers) can appear as a single logical resource. Additionally in a virtualized environment, a physical resource can appear, with somewhat different characteristics, as a logical resource.

In virtualized environments, the placement and relocation decisions for virtual machines are based on a wide variety of factors such as CPU/Memory consumption, live migration requirements (e.g. shared storage, Processor Compatibility); and, attributes of the resource pool/cluster etc. Known applications to utilize such placement and relocation decisions include tools like VMware Distributed Resource Scheduler (DRS). However, placement and relocation decisions often do not factor the cost of those decisions in terms of incremental power consumption.

It is known to provide power consumption estimates for different servers with different configurations and application workloads. For example, the data center capacity planner available from Dell Inc. provides such a function.

Accordingly, it would be desirable to enable power conservation when making placement and relocation decisions within a virtual environment.

SUMMARY OF THE INVENTION

In accordance with the present invention, a system and method for enabling power conservation when making placement and relocation decisions of virtual machines within a group of physical servers is set forth. More specifically, a virtualized environment power conservation module enables power conservation when making placement and relocation decisions within a virtual environment. The virtualized environment power conservation module assigns virtual machines among a group of physical hosts in order to minimize the net power consumption. The virtualized environment power conservation module makes use of server power profile or real time power consumption data to make power consumption aware Virtual Machine assignment decisions. In certain embodiments, a server system exposes real power consumption (e.g. System Watts, Cumulative kWh. etc.) via system management interfaces. Additionally, in certain embodiments, the server systems may expose real power consumption via standard power profiles. These systems leverage PMBus-enabled power supplies to read the power metric information.

More specifically, in one embodiment, the invention relates to a method for enabling power conservation within a virtual environment which includes determining power consumption of a plurality of virtual machines within the virtual environment, and assigning some or all of the plurality of virtual machines to a particular physical host based upon the power consumption of each of the plurality of virtual machines. The assignment of virtual machines to a group of physical hosts minimizes net power consumption of the virtual environment.

In another embodiment, the invention relates to an apparatus for enabling power conservation within a virtual environment which includes means for determining power consumption of a plurality of virtual machines within the virtual environment, and means for assigning some or all of the plurality of virtual machines to a particular physical host based upon the power consumption of each of the plurality of virtual machines. The assignment of virtual machines to a group of physical hosts minimizes net power consumption of the virtual environment.

In another embodiment, the invention relates to an information handing system that includes a processor and memory coupled to the processor. The memory stores a system for enabling power conservation within a virtual environment. The system includes instructions executable by the processor for determining power consumption of a plurality of virtual machines within the virtual environment, and assigning some or all of the plurality of virtual machines to a particular physical hosts based upon the power consumption of each of the plurality of virtual machines. The assignment of virtual machines to a group of physical hosts minimizes net power consumption of the virtual environment.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
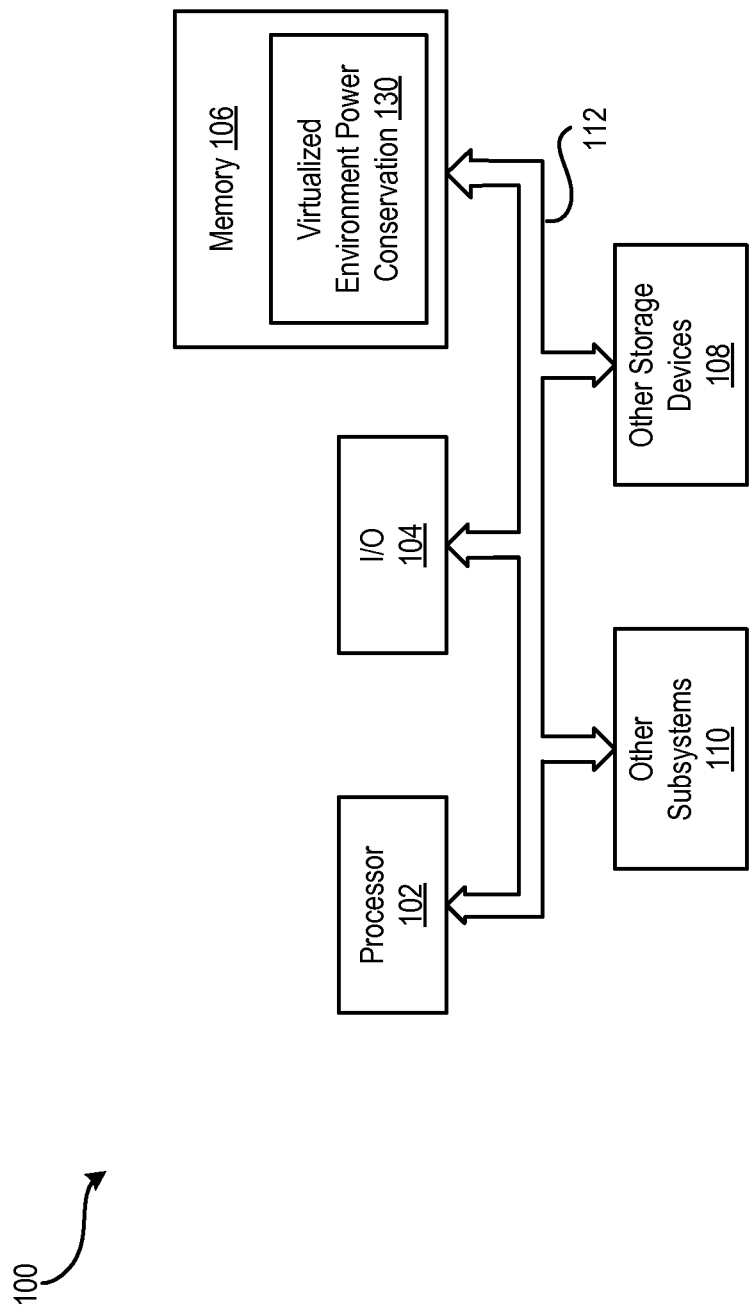
FIG. 1 shows a block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers, memory 106, including volatile memory such as random access memory (RAM) and non-volatile memory such as read only memory (ROM) and hard disk drives, and other storage devices 108, such as a floppy disk and drive or CD-ROM disk and drive, and various other subsystems 110, all interconnected via one or more buses 112. The memory 106 includes a virtualized environment power conservation module 130.

The virtualized environment power conservation module 130 enables power conservation when making placement and relocation decisions within a virtual environment. The virtualized environment power conservation module 130 assigns virtual machines among a group of physical hosts in order to minimize the net power consumption. The virtualized environment power conservation module 130 makes use of server power profile or real time power consumption data to make power consumption aware Virtual Machine assignment decisions. In certain embodiments, a server system exposes real power consumption (e.g. System Watts, Cumulative kWh. etc.) via system management interfaces. Additionally, in certain embodiments, the server systems may expose real power consumption via standard power profiles. These systems leverage PMBus-enabled power supplies to read the power metric information.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
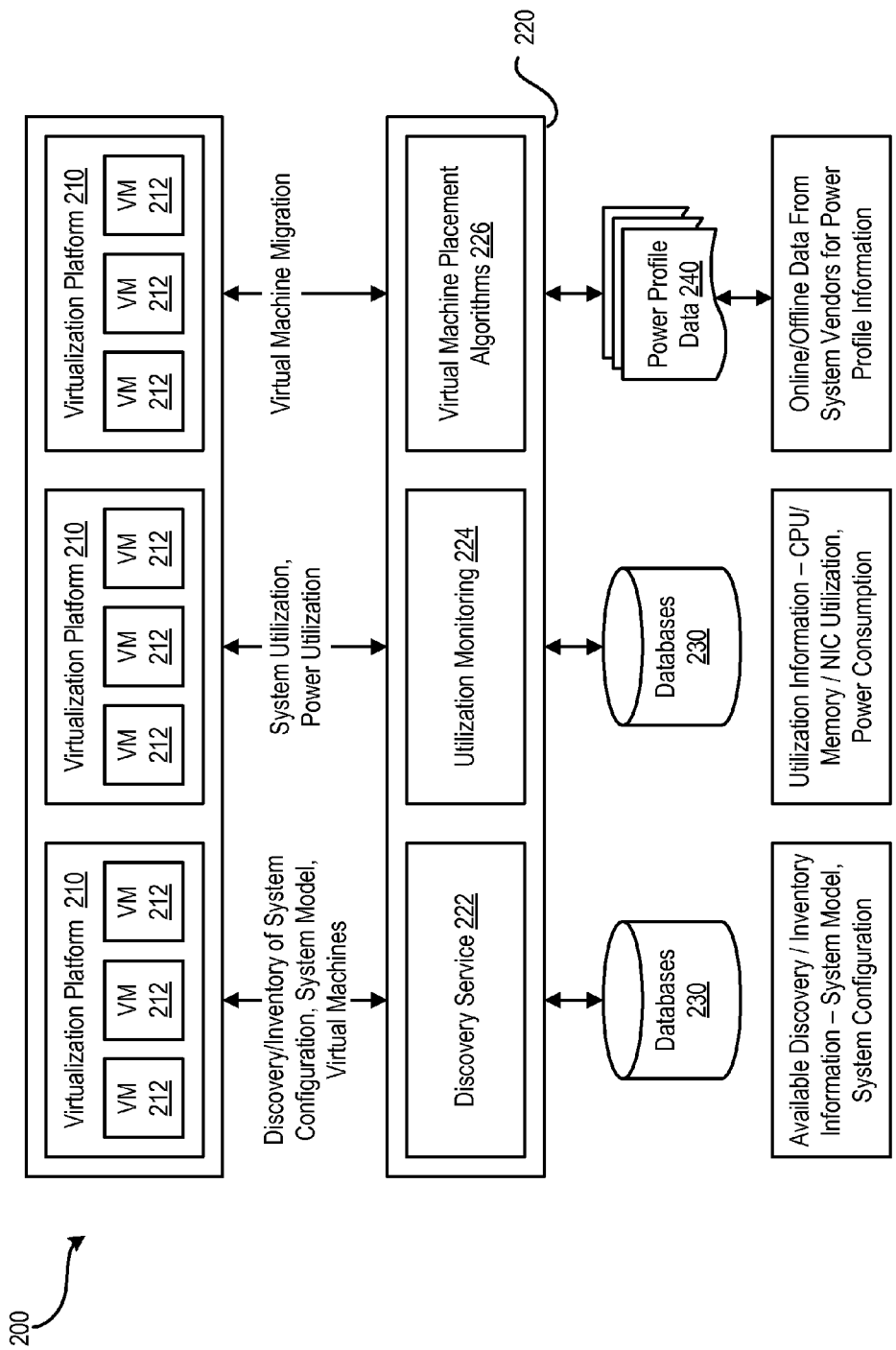
FIG. 2 shows a block diagram of virtualized environment architecture to enable power conservation.

Referring to FIG. 2, a block diagram of virtualized environment architecture 200 is shown. More specifically, the virtualized environment architecture 200 includes a plurality of servers 210, each of which may be executing one or more virtual machines 212. In certain embodiments, each server 210 comprises a server running virtualization software such as VMware's ESX server. A server running virtualization software is a component of the virtualized environment architecture 200.

The virtualized environment architecture 200 also includes centralized management services 220. The centralized management services can include discovery services 222, utilization monitoring services 224 and virtual machine placement algorithms 226.

The virtualized environment architecture 200 also includes a plurality of databases 230. Each of the disk drives may store a respective database. For example, one of the databases may store available discovery and inventory information including system model and system configuration information. Another of the databases may store utilization information such as CPU utilization information, memory utilization information, network interface controller (NIC) utilization information and power consumption information.

The virtualized environment architecture 200 also includes power profile data 240 for each respective server. The power profile data 240 can include data (such as online data) from system vendors regarding power profile information for each server.

From the power profile, by using power versus physical system utilization estimates for a specific system configuration, the virtualized environment power conservation module 130 can derive power consumption estimates for virtual machines based on a particular virtual machine configuration profile and application load type.

Figure 3:
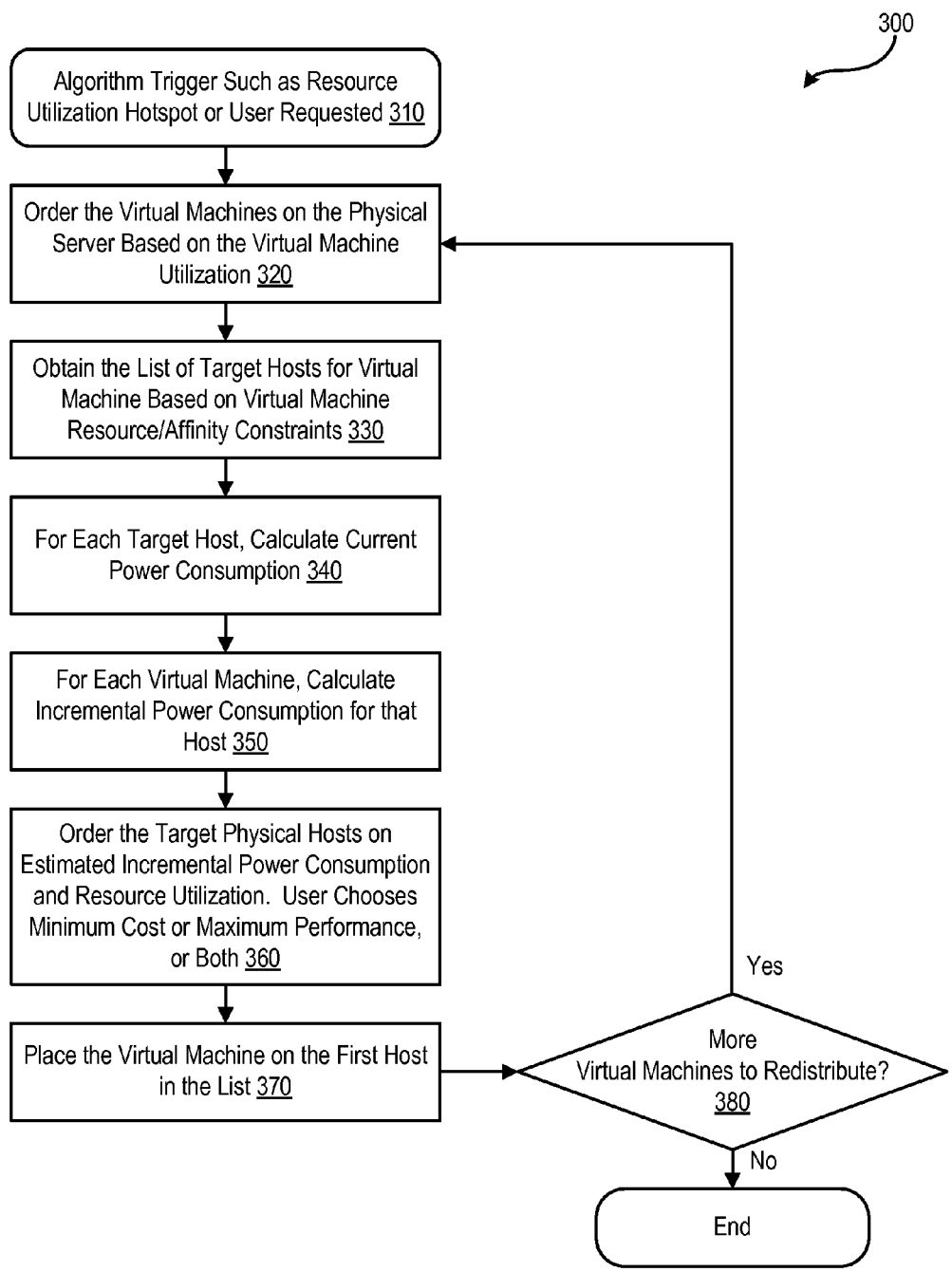
FIG. 3 shows a flow chart of the operation of a virtualized environment power conservation module.

FIG. 3 shows a flow chart of the operation of a virtualized environment power conservation module. Virtual Machine Migration strategies typically depend on Monitoring and Profiling (i.e., retrieval and profiling of utilization information), Hot Spot Detection (i.e., detecting utilization threshold violations or SLA violations), and Hot Spot Mitigation (i.e., determining which Virtual Machines to migrate and where).

Mitigation techniques typically rely on greedy heuristics to guide the migration process. A cost-based greedy heuristic can be used by the virtualized environment power conservation module 130 to minimize the cost of the placement. More specifically, if a hot spot (e.g. due to a resource utilization threshold breach) is detected at step 310, then the virtualized environment power conservation module 130 orders the Virtual Machine on that physical server based on the Virtual Machine utilization at step 320. The module uses heuristics to capture utilization across multiple dimensions (CPU, Memory, and NIC).

Next, the virtualized environment power conservation module 130 obtains a list of appropriate target hosts for a Virtual Machine based on Virtual Machine resource constraints at step 330 (e.g. required CPU/Memory, migration compatibility, virtual machine to virtual machine or virtual machine to physical host affinity, etc.). If no target host is found, then the process proceeds to the next Virtual Machine.

Next, for each target host: derive the power consumption either based on an actual or estimated reading based on the power profile data and for each Virtual Machine, based on its current absolute utilization at step 340, the virtualized environment power conservation module 130 computes an estimated incremental power consumption if the Virtual Machine were to run on that host at step 350. This estimate can be extrapolated from data that represents the power consumption vs. system utilization (e.g., from a graph for a physical system showing power consumption vs. system utilization). The data points can be real or estimated values.

Next, the virtualized environment power conservation module 130 orders the hosts in ascending order based on a user-configured weighted average of estimated incremental power consumption and current utilization on a system at step 360. If the user chooses to solely depend on cost (Minimize Cost), then this list is ordered based on increasing incremental power consumption. If the user chooses to maximize performance, then the list is ordered by increasing utilization. If the user chooses both, then the list by increasing utilization is re-sorted based on increasing power profile data.

Next, at step 370, the virtualized environment power conservation module 130 places the Virtual Machine on the first host on the prioritized list. This process is repeated until sufficient Virtual Machines are migrated from the physical server and the utilization falls below the thresholds as determined at step 380.

The virtualized environment power conservation module 130 may be used for incremental placements or may be executed periodically to enable a more optimal placement of Virtual Machines.

Figure 4:
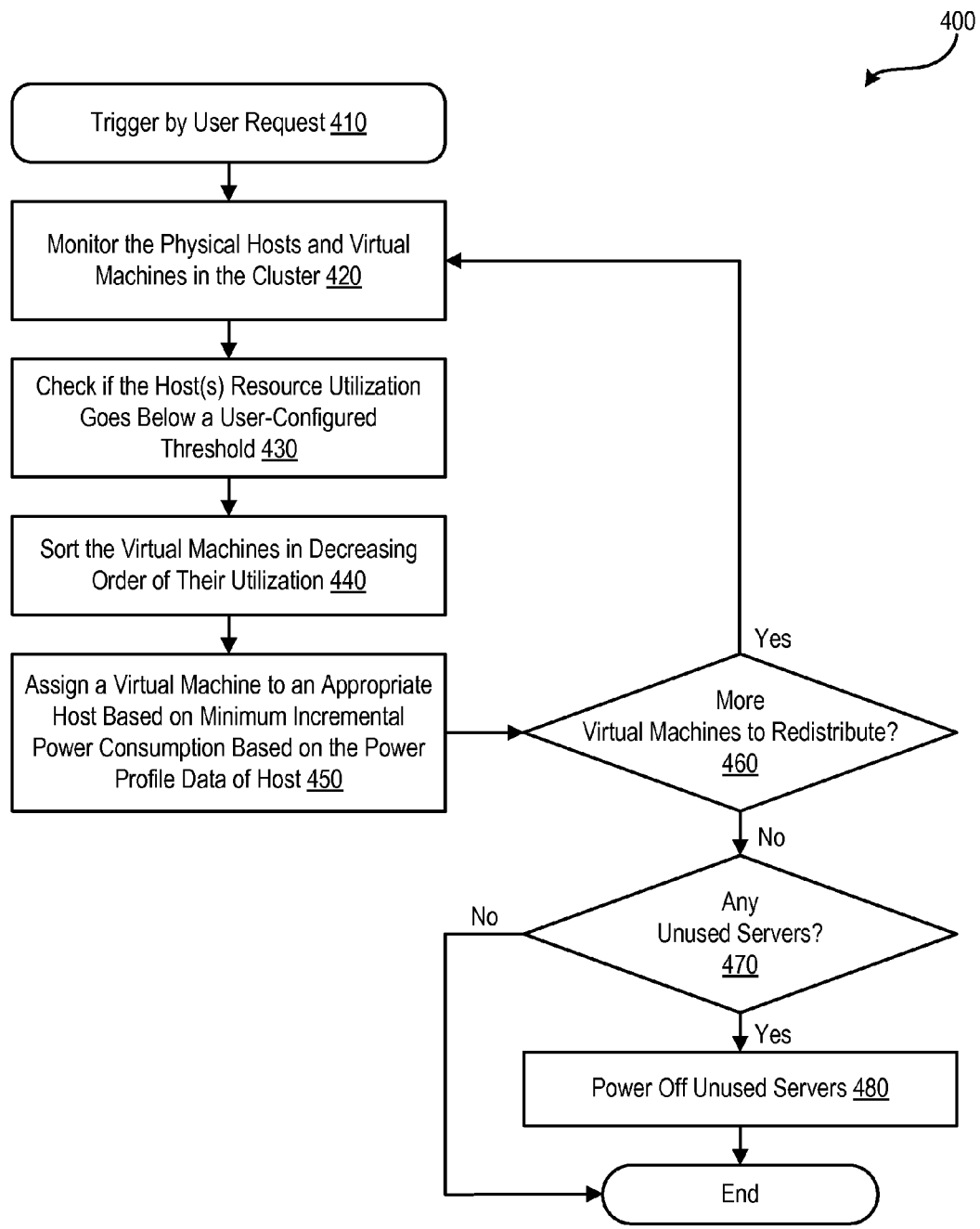
FIG. 4 shows a flow chart of the operation of a virtualized environment power conservation module.

A variation of the operation shown in FIG. 3 could also be used in other contexts such as powering devices on or off based on workload characteristics, as shown in FIG. 4.

More specifically, operation of the virtualized environment power conservation module 130 may be triggered by a user request at step 410, the virtualized environment power conservation module 130 monitor the physical hosts and Virtual Machines in the cluster at step 420. Next, the virtualized environment power conservation module 130 determines whether the utilization is lower than a user-configured threshold at step 430. Next, the virtualized environment power conservation module 130 sorts the Virtual Machines based on their utilization at step 440. Next, at step 450, the virtualized environment power conservation module 130 assigns a virtual machine to an appropriate host based upon a minimum incremental power consumption based upon the power profile data of the host.

The virtualized environment power conservation module 130 then determines whether there are any remaining virtual machines to redistribute at step 460. If yes, then the virtualized environment power conservation module 130 returns to step 420 to monitor the physical hosts and Virtual Machines in the cluster. If there are no remaining virtual machines to redistribute, then the virtualized environment power conservation module 130 determines whether there are any unused servers at step 470. If there are unused servers then the process completes execution. If there are any unused servers (as may be the case due to the redistribution of the virtual machines), then the virtualized environment power conservation module 130 powers off the unused servers at step 480 and then the process completes execution The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, when virtual machines or physical servers are powered on to handle increased cluster workloads, the virtual machines can be started on physical servers based on the least incremental power consumption.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for enabling power conservation within a virtual environment comprising:
    determining power consumption of a plurality of virtual machines within the virtual environment, the determining comprising using server power profile data and real time power consumption data to determine power consumption to each of the plurality of virtual machines;
    assigning some or all of the plurality of virtual machines to a particular physical host based upon the power consumption of each of the plurality of virtual machines, the assigning virtual machines to the group of physical hosts minimizing net power consumption of the virtual environment, the assigning comprising making power consumption aware virtual machine assignment decisions based upon using server power profile data and real time power consumption data; and wherein
    the plurality of virtual machines are executing within a server system;
    the server system further includes a plurality of controllable power supplies, the plurality of controllable power supplies comprising respective Power Management Bus (PMBus) enabled power supplies, the PMBus enabled power supplies enabling power metric information to be read from the PMBus enabled power supplies via a power management bus; and,
    each of the plurality of controllable power supplies are controlled when assigning the virtual machines to enable power conservation when making placement and relocation decisions within a virtual environment.

2. The method of claim 1 wherein:
    power consumption of the server system is exposed via respective system management interfaces.

3. The method of claim 1 wherein:
    the controllable power supplies are controlled via the power management bus.

4. The method of claim 3 wherein:
    the power management bus comprises a PMBus type power management bus.

5. An apparatus for enabling power conservation within a virtual environment comprising:
    means for determining power consumption of a plurality of virtual machines within the virtual environment, the means for determining comprising means for using server power profile data and real time power consumption data to determine power consumption for each of the plurality of virtual machines; and, means for assigning some or all of the plurality of virtual machines to a particular physical host based upon the power consumption of each of the plurality of virtual machines, the assigning virtual machines to the group of physical hosts minimizing net power consumption of the virtual environment, the means for assigning comprising means for making power consumption aware virtual machine assignment decisions based upon using server power profile data and real time power consumption data; and wherein the plurality of virtual machines are executing within a server system;

the server system further includes a plurality of controllable power supplies, the plurality of controllable power supplies comprising respective Power Management Bus (PMBus) enabled power supplies, the PMBus enabled power supplies enabling power metric information to be read from the PMBus enabled power supplies via a power management bus; and, each of the plurality of controllable power supplies are controlled when assigning the virtual machines to enable power conservation when making placement and relocation decisions within a virtual environment.

6. The apparatus of claim 5 wherein:
power consumption of the server system is exposed via respective system management interfaces.

7. The apparatus of claim 5 wherein:
the controllable power supplies are controlled via the power management bus.

8. The apparatus of claim 7 wherein:
the power management bus comprises a PMBus type power management bus.

9. An information handing system comprising:
a processor;
memory coupled to the processor, the memory storing a system for enabling power conservation within a virtual environment, the system comprising instructions executable by the processor for:

determining power consumption of a plurality of virtual machines within the virtual environment, the determining comprising using server power profile data and real time power consumption data to determine power consumption to each of the plurality of virtual machines; and, assigning some or all of the plurality of virtual machines to a particular physical host based upon the power consumption of each of the plurality of virtual machines, the assigning virtual machines to the group of physical hosts minimizing net power consumption of the virtual environment, the assigning comprising making power consumption aware virtual machine assignment decisions based upon the server power profile data and real time power consumption data; and wherein the plurality of virtual machines are executing within a server system;

the server system further includes a plurality of controllable power supplies, the plurality of controllable power supplies comprising respective Power Management Bus (PMBus) enabled power supplies, the PMBus enabled power supplies enabling power metric information to be read from the PMBus enabled power supplies via a power management bus; and, each of the plurality of controllable power supplies are controlled when assigning the virtual machines to enable power conservation when making placement and relocation decisions within a virtual environment.

10. The information handling system of claim 9 wherein:
power consumption of the server system is exposed via respective system management interfaces.

11. The information handling system of claim 9 wherein:
the controllable power supplies are controlled via the power management bus.

12. The information handling system of claim 11 wherein:
the power management bus comprises a PMBus type power management bus.

* * * * *